April 6, 1965  D. C. HOWLAND  3,176,591

DIFFERENTIAL PRESSURE FLOW VALVE

Filed Oct. 9, 1962

INVENTOR
DONALD C. HOWLAND
BY
Nilsson & Robbins
ATTORNEYS

United States Patent Office 3,176,591
Patented Apr. 6, 1965

3,176,591
DIFFERENTIAL PRESSURE FLOW VALVE
Donald C. Howland, Costa Mesa, Calif., assignor to Ex-Cell-O Corporation, Costa Mesa, Calif., a corporation of Michigan
Filed Oct. 9, 1962, Ser. No. 229,784
1 Claim. (Cl. 91—433)

The present invention relates to hydraulics and particularly to a structure for damping resonant loads as may be applied to hydraulic control systems.

The load of a hydraulic control system is often carried on a double-acting piston housed in a pressure-containing cylinder. By controlling the flow of fluid to and from the ports in the cylinder, the system acts to variously position the piston in the cylinder to in turn position the load. As it effects the load during static operation, the hydraulic system in an arrangement of this type may be considered to some extent the equivalent of a mechanical spring. Due to this spring effect, resonant vibrations by the load can drive the entire system into oscillation at an amplitude that will result in loss of control and even system destruction.

To prevent unstable oscillation in hydraulic systems resulting from resonant loads, conventional practice has been to provide some form of damping. For example, a piston by-pass orifice may sufficiently suppress the spring characteristics of the hydraulic system and thereby prevent oscillations. That is, by interconnecting the ends of a cylinder (to by-pass the piston) through a passage containing an orifice, high-frequency load vibrations are damped as a result of the fluid being forced through the orifice. Thus, stable operation is achieved.

Although piston by-pass orifices are suitable to stabilize resonant loads carried by hydraulic systems, they have certain attendant disadvantages. Specifically, the fluid passed through the orifice represents dissipated power, and this loss often occurs during intervals when damping is not required. Furthermore, orifice damping systems tend to be somewhat non-linear in operation. Therefore, a need exists for a hydraulic system that is stable under resonant loads, is somewhat linear in operation, and does not dissipate considerable power to accomplish these characteristics. Furthermore, it is desirable that the system be economical to manufacture and capable of providing reliable operation under adverse conditions.

In general, the present invention comprises a hydraulic system wherein resonant loads are damped without substantial loss of power. In the system, frequency-selective hydraulic apparatus acts to develop pressure variations in a control chamber which serve to control feedback which opposes the resonant load oscillations. Specifically, a pressure differential, as between the fluid at the ends of a double-acting piston, may be applied to a free piston in the damping apparatus, which is held between balance springs. One of the passages serving to apply pressure to the free piston in the damping apparatus contains an orifice with the result that the actual control pressure differential developed by the free piston and the orifice is frequency selective to load variations. This control pressure differential is employed to control a feedback valve to stabilize the systems operation in the selected frequency range of load variations. By employing a single cylinder for the free piston and to house a spool valve, considerable economy is accomplished in the system of the present invention.

An object of the present invention is to provide an improved hydraulic servo valve.

Another object of the present invention is to provide an improved apparatus for stabilizing the effect of a resonant load on a hydraulic control system.

Still another object of the present invention is to provide a hydraulic system in which resonant loads are damped without substantial power dissipation.

A further object of the present invention is to provide a hydraulic system for damping the effects of high-inertia resonant loads, which system is economical in manufacture and operation.

Still a further object of the present invention is to provide a simple and effective means for economically damping the effects of resonant loads on a hydraulic control system.

These and other objects of the present invention will become apparent from a consideration of the following, taken in conjunction with the referenced drawings, wherein.

Figure 1:
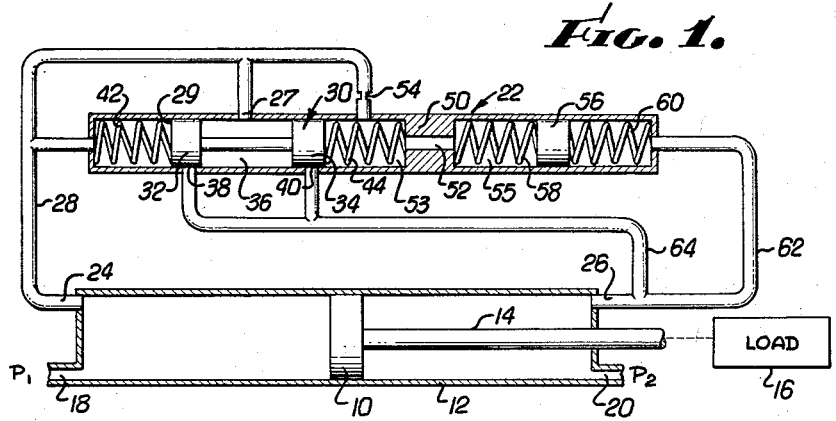
FIGURE 1 is a diagrammatic representation of an apparatus constructed in accordance with the present invention.

Referring initially to FIGURE 1, there is shown a double-acting piston 10 housed in a cylinder 12. A connecting rod 14 couples the piston 10 to a load 16 (shown as a block). The cylinder 12 has a port 18 ahead of the piston 10 and a port 20 behind the piston. The application of inversely-varying fluid pressures to the ports 18 and 20 causes the piston 10 to be variously positioned and to in turn drive the load 16.

In many situations the load 16 experiences considerable external forces which result in the application of resonant forces to the piston 10. If the effects of these resonant forces are not damped, the slightly-elastic hydraulic fluid contained in the cylinder 12 and the associated control system (not shown) may reenforce the resonant forces, causing the system to break into uncontrolled oscillation, which may result in a total system failure.

The apparatus of the present invention which inhibits such uncontrolled oscillation, includes an elongate cylinder 22 that is variously connected to ports 24 and 26 at the left and right ends respectively of the cylinder 12. Specifically, the left port 24 is connected through a fluid passage 28 into the closed left end of the cylinder 22, to apply fluid pressure to one planar end surface 29 of a slider or spool valve 30 slidably mounted in the cylinder 22. The spool valve 30 carries two short cylindrical lands 32 and 34, and the cavity 36 between the lands is directly connected through a port 27 to the passage 28 which communicates with the head or left end of the cylinder 12.

The spool valve 30 is positioned so that the lands 32 and 34 close the ports 38 and 40 in the cylinder during the quiescent state. The spool valve is held in various positions by the pressures to which it is subjected, and by coil end springs 42 and 44 which abut the planar end surfaces of the lands 32 and 34. The spring 42 is supported by the left end closure of the cylinder 22 while the spring 44 is supported by a fixed wall 50 having a passage 52 therethrough.

A cavity 53 on the valve side of the wall 50 is connected to the passage 28 through an orifice 54. A cavity 55 on the other side of the wall 50 contains a free-sliding piston 56 held between a pair of coil springs 58 and 60. The spring 58 is supported by the wall 50 while the spring 60 is supported by the closed right end of the cylinder 22.

The space to the right of the piston 56, containing the spring 60, is connected by a passage 62 to the port 26 in the cylinder 12, which port is also connected through a passage 64 to both the valve ports 38 and 40 in the cylinder 22.

In the operation of the apparatus of FIGURE 1, the pressure differential across the double-acting piston 10 is applied through the orifice 54 across the spring-balanced free piston 56. Therefore, depending upon the size of the orifice 54 the spring constants of the springs 58 and 60 (normally the same) and the relationships between these factors, the system is sensitive to a range of resonant loads to develop a control pressure differential across the planar end surfaces of the spool valve 30, which serves to control the by-pass of fluid about the piston 10 to thus dampen resonant loads when required.

Considering an exemplary operation of the system, the selected design will often be operative to by-pass high-frequency resonant load variations while maintaining stiff control for low-frequency load variations. Therefore, assuming such a design, further assume a shock is applied by the load 16 to the piston 10, with the force being almost instantly applied to its full magnitude. Of course, this load variation is essentially high-frequency in nature.

The assumed load variation tends to move the piston 10 to the left; therefore, the pressure in the passage 24 increases very rapidly while the pressure in the passage 62 decreases in a similar fashion. The reduced pressure in the passage 62 is applied to the right side of the free-piston 56 to urge it to the right, enlarging the effective volume of the cavity 55 and reducing the pressure therein. Furthermore, the pressure increase in the passage 28 is delayed in application to the left side of the free piston 56 due to the operation of the orifice 54. As a result, the planar end of the land 34 is subjected to a lower pressure than the planar end of the land 32 which receives the total increased pressure in the passage 28. Therefore, the spool valve 30 is urged to the right, to open the port 40 permitting fluid to flow from the cylinder 12 through the passage 28, about the spool valve 30, out of the port 40 and through the passage 64 and back to the cylinder 12 at the other side of the piston. Thus, the assumed shock is dampened as a result of fluid flow and is not reinforced by sympathetic vibrations of the hydraulic system.

The described damping occurred because the shock applied to the piston 10 occurred rapidly, and that shock caused the spool valve 30 to be opened due to the combined action of the orifice 54 and the free piston 56. A recurring high-frequency resonant shock load would result in a similar damping operation; however, the spool valve would alternately open the ports 38 and 40 to accomplish piston by-pass.

Upon the occurrence of low-frequency load variations, and during control operations, the spool valve 30 maintains the ports 38 and 40 closed because the control pressure applied to the end of the land 34, and developed by the combined operation of the orifice 54 and the free piston 56 does not differ sufficiently from the pressure in the passage 28 to open the spool valve 30. As a result, selective by-pass is accomplished, and hydraulic power is not uselessly dissipated by the damping system.

Figure 2:
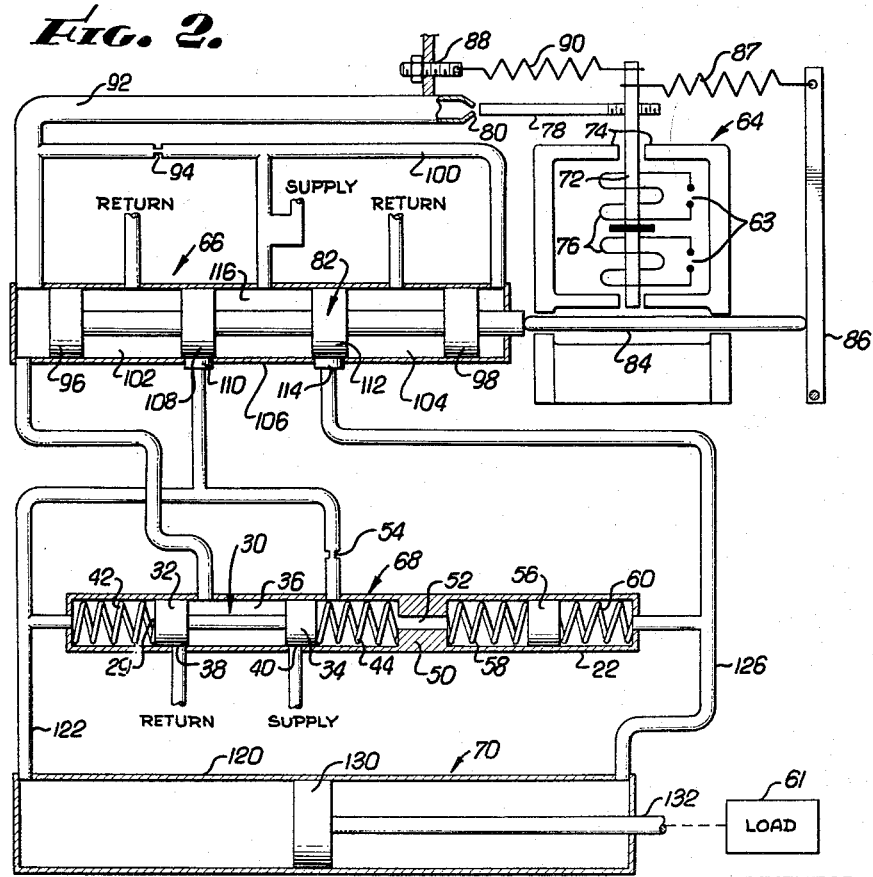
FIGURE 2 is a diagrammatic representation of a control servo valve constructed in accordance with the present invention.

The system of FIGURE 1 discloses a damping apparatus which functions independent of the hydraulic control system (connected to ports 18 and 20). However, in some instances it is desirable to provide a cooperative relationship between the damping system and the control system. Such an arrangement is shown in FIGURE 2, and will now be considered. A load is controlled by the system in accordance with electrical signals applied at the terminals 63 which provide the input to a torque motor 64. Control is accomplished by a servo valve 66, controlled by the torque motor, which valve operates in conjunction with a damping apparatus 68 to drive an actuator 70 that is coupled to the load 61.

The operation of motors as the torque motor 64 to control a servo valve is well known and is described in detail in United States Patent 2,934,765 issued April 26, 1960 to T. H. Carson. In general, operation is as follows. An armature 72 in the motor 64, is pivotably mounted and subjected to magnetic forces as a result of contiguous permanent magnets 74 and signal-controlled electro-magnetic coils 76 on the armature. These forces variously position an arm 78, affixed to the armature, relative to an orifice 80, the flow from which determines the position of a spool valve 82 in the servo valve 66. The position of the spool valve is manifest as feedback to the armature 72 through a slider 84, a pivotably-mounted feedback beam 86 and a spring 87. The position of the armature 72 may be adjusted by a set screw 88 that is coupled to the armature by a spring 90. Thus depending on the electrical signals applied to the terminals 62, and energizing the coils 76, the arm 78 is variously positioned to regulate the fluid flow from the orifice 80 out of a cavity 92.

The cavity 92 is pressurized from a supply source of pressurized fluid through an orifice 94 and provides control pressure to the planar end surface of a land 96 of the spool valve 82. A land 98 at the other end of the spool valve 82 has an annular end surface exposed to the supply pressure as a result of a connecting passage 100. Therefore, the position of the spool valve is controlled by pressure variations in the cavity 92 relative to the supply pressure. As indicated above, the pressure in the chamber 92 depends on the setting of the orifice 80 under control of the torque motor 64.

The cavities 102 and 104 internal of the lands 96 and 98, respectively, are connected to a return line (not shown) which may comprise a sump from which fluid may be drawn to be re-pressurized. The cavity 102 is closed within the valve cylinder 106 by a land 108 which operates in conjunction with a port 110 in the cylinder. The cavity 104 is similarly closed by a land 112 which operates with a port 114. The cavity 116 between the lands 108 and 112 is connected to the fluid supply to receive pressurized fluid.

The port 110 is connected to the head end of a cylinder 120 comprising the actuator 70, through a passage 122. The port 114 is then connected to the other end of the cylinder 120 through a passage 126. Therefore, depending upon the position of the spool valve 82, the passages 122 and 126 are either both isolated or oppositely connected to the pressure fluid supply and the low-pressure return line. In the latter instance, a pressure difference is applied in the cylinder 120 across a double-acting piston 130 which is connected by a rod 132 to the load 60. Of course, this pressure difference results in a change in position of the piston 130 to control the load.

During intervals when the actuator 70 is active to drive the load 60, it is desirable that the damping apparatus 68 be somewhat inactive; however, when the load presents high frequency resonant variations to the actuator, damping is required. To accomplish such selective damping, the passages 122 and 126 are variously connected to the damping apparatus 68. The structure of the damping apparatus is similar to that disclosed in FIGURE 1, and like components are similarly identified. In the connection of the damping apparatus 68 into the remainder of the system, the passage 122 is connected to the left end of the cylinder 22 housing the damping apparatus. The passage 122 is also connected through the orifice 54 to the mid-section of the cylinder 22, and to the port 110 in the servo valve 66. The right end of the cylinder 22 is connected to the port 114.

In considering an exemplary operation of the system of FIGURE 2, assume that a shock force is suddenly applied by the load 60 to urge the piston 130 to the right. The load change assumed is thus of the high-frequency or sudden-change type. Upon the occurrence of this load change the pressure in the passage 126 rapidly increases while that in the passage 122 decreases in a similar manner. The sharp pressure increase the passage 126 is applied to the right end of the free piston 56 urging it to the left to increase the pressure on the right planar end of the land 34. Simultaneously, the decreased pressure in the passage 122 is manifest on the end surface of the land 32 so that the spool valve 30 is urged to the right to open the port 34 which is connected to the return line of the system. Therefore, fluid flows from the cavity 92 through the spool valve cavity 36 to the return line, thus relieving the pressure in the cavity 92 and permitting the spool valve 82 in the servo to move to the left. As a result, the port 110 is opened to supply pressure and the port 114 is open to the return line. The fluid from the supply source increases the pressure in the passage 122 while the connection (through port 114) of the passage 126 to the return line decreases the pressure in the passage 126. Thus, effects are obtained which oppose those of the assumed sudden load change to accomplish the desired damping.

In the event of a load variation opposed to that assumed, the spool valve 39 is urged to the right by the combined operation of the spring supported free piston 56 and the orifice 54. Therefore, cavity 92 is connected to supply pressure through the port 36 and the spool valve 82 is urged to the right. This change results in the passage 122 being connected to the return line while the passage 126 is connected to the supply pressure line. As a result, the pressure changes resulting from the load change are again relieved, to accomplish the desired damping.

It is to be noted that the operation of the servo control valve 66 to control the actuator 70 is substantially unaffected by the damping apparatus 68, in that this control overrides the effect of the damping apparatus, and furthermore the control operations normally occur at relatively low frequencies at which the damping apparatus is ineffective.

Thus, the system of FIGURE 2 accomplishes damping on a frequency-selective basis and avoids the occurrence of resonant oscillations in the system.

It is to be noted that an important feature of the present invention resides in the provision of a frequency-selective means, e.g. the spring-held free piston 56 operating in conjunction with the orifice 54, to accomplish damping at desired intervals.

Other important features of the present invention will be readily apparent to one skilled in the art; however, it is to be understood that the present invention is not to be limited to the details of the embodiments disclosed herein, which have been presented as examples only of the invention. The scope of the invention is to be determined in accordance with the claim set forth below.

What is claimed is:

A hydraulic system for positioning a load in accordance with a control signal comprising: a hydraulic actuator adapted to be connected to said load and including a double-acting piston which may be variously positioned to divide said actuator into a first and a second cavity; hydraulic valve means incorporating feedback means and adapted to be connected to a source of hydraulic fluid under pressure and a hydraulic return, said valve means being controlled by said control signal to pressurize and relieve said first and second cavities whereby to position said double-acting piston; a cylinder; an orifice; means connecting said orifice between said first cavity and said cylinder; a free piston closing said cylinder on one side of the orifice connection; first and second coil spring means positioned on opposite sides of said free piston for balancing the position of said free piston; means for applying the pressure in said second cavity to said free piston to vary the operating volume in said cylinder; and slider valve means closing said cylinder on the other side of the orifice connection whereby to be controlled by the pressure in said cylinder to directly control said hydraulic valve means thereby to adjust the pressures in said first and second cavities whereby to damp resonant loads on said double-acting piston by pressurizing and relieving said first and second cavities.

References Cited by the Examiner
UNITED STATES PATENTS 3,042,005 7/62 Gray _____ 91—51
3,064,627 11/62 Blanton _____ 91—433

FRED E. ENGELTHALER, *Primary Examiner.*